United States Patent
Reysa

(10) Patent No.: US 7,213,210 B2
(45) Date of Patent: May 1, 2007

(54) METHOD, APPARATUS AND COMPUTER PROGRAM PRODUCT FOR MANAGING E-MAIL MESSAGES

(75) Inventor: John Richard Reysa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/406,655

(22) Filed: Apr. 3, 2003

(65) Prior Publication Data
US 2004/0210587 A1   Oct. 21, 2004

(51) Int. Cl.
*G06F 3/00* (2006.01)
*G06F 9/46* (2006.01)

(52) U.S. Cl. .................. 715/752; 715/809; 715/963; 705/9

(58) Field of Classification Search ................ 715/703, 715/752, 809, 963; 705/9
See application file for complete search history.

(56) References Cited

U.S. PATENT DOCUMENTS

| | | | |
|---|---|---|---|
| 5,748,884 A | 5/1998 | Royce et al. | |
| 6,108,688 A * | 8/2000 | Nielsen | 709/206 |
| 6,272,532 B1 * | 8/2001 | Feinleib | 709/206 |
| 6,327,656 B2 | 12/2001 | Zabetian | |
| 6,828,989 B2 * | 12/2004 | Cortright | 715/769 |
| 2001/0034769 A1 * | 10/2001 | Rast | 709/206 |
| 2002/0083139 A1 * | 6/2002 | Menez | 709/206 |
| 2002/0099777 A1 * | 7/2002 | Gupta et al. | 709/206 |
| 2002/0198951 A1 * | 12/2002 | Thurlow et al. | 709/206 |
| 2003/0171971 A1 * | 9/2003 | Lovekin et al. | 705/9 |
| 2004/0172454 A1 * | 9/2004 | Appelman et al. | 709/206 |
| 2005/0210114 A1 * | 9/2005 | Washburn | 709/206 |

FOREIGN PATENT DOCUMENTS

| | | |
|---|---|---|
| EP | 1098481 A2 | 5/2001 |
| JP | 10293734 A | 11/1998 |
| JP | 2000172580 A | 6/2000 |
| JP | 2000172581 A | 6/2000 |
| JP | 2001292273 | 10/2001 |
| JP | 2001337896 A | 12/2001 |

OTHER PUBLICATIONS

IBM Research Disclosure, "Time Dependent Email Attachment Execution", Apr. 1998, vol. 41, Issue 408.*
IBM Research Disclosure 410121, "Time Dependent Email Attachment Execution", Jun. 1998, p. 807.
Whittaker, S. et al., "Email Overload: Exploring Personal Information Management of Email", Human Factors in Computing Systems. Common Ground CHI 96 Conference Proceedings, Apr. 13-18, 1996, Vancouver BC, pp. 276-283, Published NY, 1996.

* cited by examiner

*Primary Examiner*—Sy D. Luu
(74) *Attorney, Agent, or Firm*—Cal Salys; Anthony V.S. England

(57) ABSTRACT

In a method form, the invention includes generating a first snooze button associated with a user interface for displaying e-mail messages, wherein the e-mail messages have been sent to the user. A dialog box is generated responsive to user activation of an instance of the first snooze button associated with a displayed one of the e-mail messages. The dialog box displays at least one time field for specifying a time and a second snooze button. The e-mail message is moved from the user inbox to a snooze folder responsive to user activation of the second snooze button. The e-mail message is re-sent from the snooze folder back to the user inbox responsive occurrence of a time specified in the a least one time field.

21 Claims, 5 Drawing Sheets

METHOD, APPARATUS AND COMPUTER PROGRAM PRODUCT FOR MANAGING E-MAIL MESSAGES

BACKGROUND

1. Field of the Invention

The present invention concerns managing e-mail messages, and more particularly concerns moving e-mail messages from a user inbox to a folder responsive to a user action, and then re-sending the message from the folder back to the user inbox responsive occurrence of a certain time.

2. Related Art

E-mail is so extensively used that it is often difficult to keep up with incoming e-mail messages, which compete with one another for the recipient's attention. This problem has previously been addressed in a variety of ways.

Referring now to FIG. 1, a view is depicted of an inbox 110, according to the prior art. In this view, e-mail message list 120 is shown listing three messages. The list 120 displays information for "Date," "From" and "Subject" fields 130. The inbox 110 view includes buttons 140 for selectively saving, forwarding, replying to or deleting messages in the list. One developer has suggested that a sender include a date and time in the subject field 130 of an e-mail message, as shown for one of the messages in the list 120 depicted in FIG. 1. IBM Research Disclosure, June 1998, page 807. Then, when the recipient views the message list 120 and observes the date and time in the subject field 130 for one of the messages, the recipient/user may initiate a date and time folder program. Presumably this may be done such as by actuating a date/time button 140 for the message, as shown. Responsively, the program receives the date and time of the e-mail message and stores the message in a date/time folder 160. A process 170 of the program sets a timer responsive to the date and time of the subject field 130.

Referring now to FIG. 2, the e-mail message 210 is shown that was stored in FIG. 1 in folder 160. According to the Research Disclosure, page 807, the program automatically flashes the e-mail message 210 on the user's display when the specified date/time occurs. A dialog box 220 is also automatically flashed on the user's display, presenting the user with means to view or execute any attachment to the message 210. The box 220 also permits the user to select to ignore the message 210. Alternatively, the user may "snooze" the message 210 for some variable number of minutes, whereupon the message 210 and dialog box 220 will again automatically flash on the user's display. This arrangement is useful, but it is geared toward control by use of the subject field, which is originally composed by the sender. Use of the same field by the recipient might lead to confusion. Also, a user may find it intrusive to have an e-mail message automatically pop up on the user display at a scheduled time. The Research disclosure does not indicate other options for dealing with the message.

Referring now to FIG. 3, another prior art arrangement is depicted. In this case, the developer suggests that there should also be a "category," or the like, among the fields 130 for the messages in the inbox 110 message list 120, so that the recipient may selectively categorize messages as "action items." S. Whittaker and C. Snider, "Email Overload: Exploring Personal Information Management of Email," Human Factors in Computing Systems. Common Ground, CHI 96 Conference Proceedings, 1996, pp. 276–283, p. 282. One implementation of this disclosure is depicted in FIG. 3. Whittaker et al. indicate that messages categorized as action items are left in the inbox 110, as depicted here. They also mention for action items that cannot be or do not need to be done immediately that it would be useful for these items to be programmed to "reappear." Whittaker et al. do not indicate how this reappearance should be implemented. Presumably, one manner of "reappearing" consistent with the teaching by Whittaker et al. that action items should remain in the inbox 110 would be an arrangement similar to what is set out herein in the above described FIG's 1 and 2. That is, in accordance with the IBM Research Disclosure a "reappearing" e-mail message would automatically flash on the user's screen at the designated time. As previously stated, however, a user may find this rather intrusive.

This has been a brief review of two prior art disclosures known to the applicant regarding how to manage e-mail messages. This review illustrates that a need exists for further improvements in managing e-mail messages.

SUMMARY

The forgoing need is addressed by the present invention, according to one aspect of which a method is provided for managing e-mail messages, in which a first snooze button associated with a user interface is generated for displaying e-mail messages, wherein the e-mail messages have been sent to the user. A dialog box is generated responsive to user activation of an instance of the first snooze button associated with a displayed one of the e-mail messages. The dialog box displays at least one time field for specifying a time and a second snooze button. The e-mail message is moved from the user inbox to a snooze folder responsive to user activation of the second snooze button. The e-mail message is re-sent from the snooze folder back to the user inbox responsive occurrence of a time specified in the a least one time field.

Additional aspects, objects, advantages and other forms of the invention will become apparent upon reading the following detailed description and upon reference to the accompanying drawings.

FIG's 5A, 5B and 5C illustrate aspects of processing and displaying an e-mail from an inbox view, according to an embodiment of the present invention.

Figure 6:
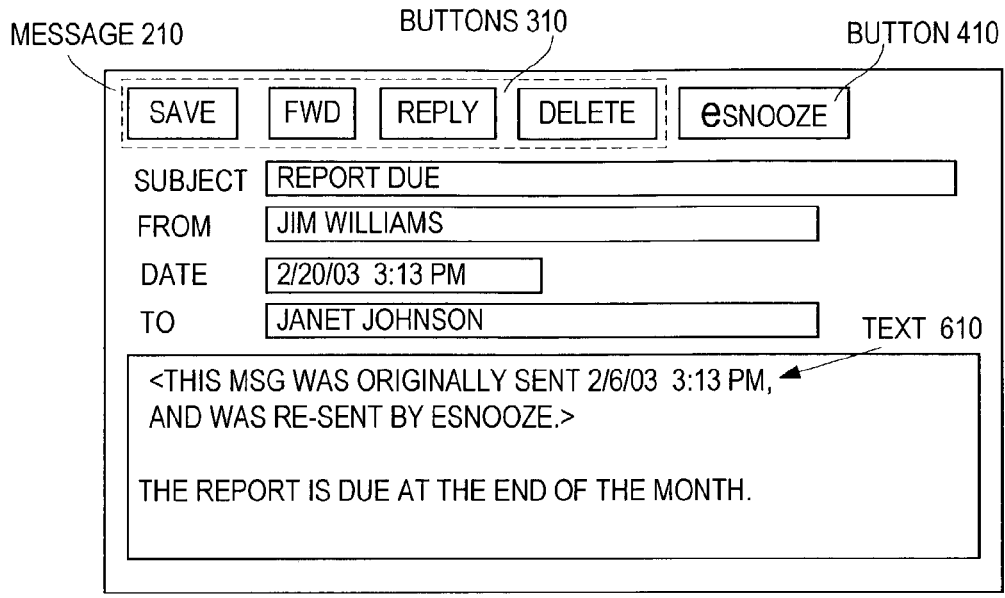

FIG. 6 illustrates an e-mail message including an embedded original date and a new date on which the e-mail is re-sent, according to an embodiment of the present invention.

Figure 7:
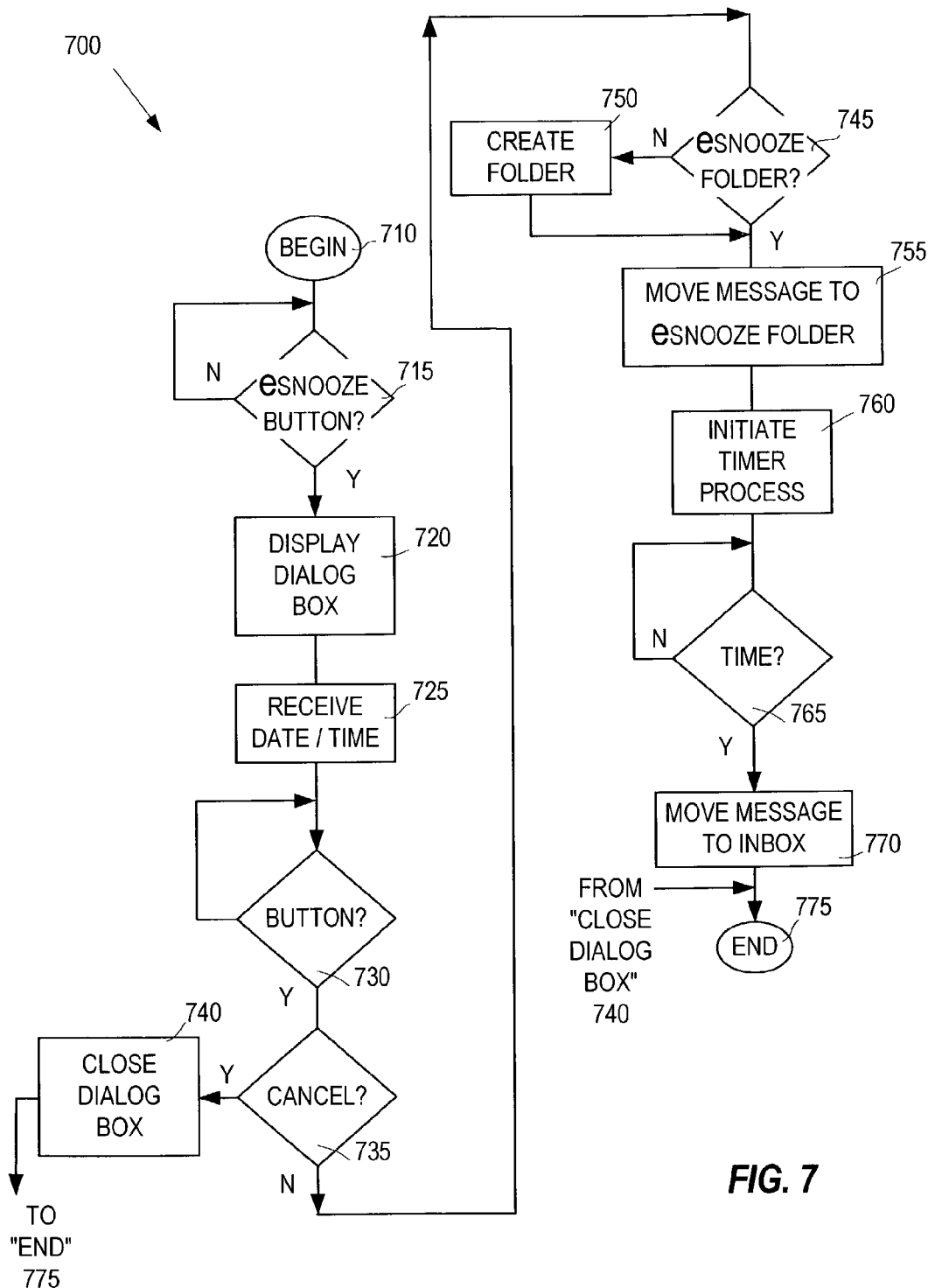

FIG. 7 illustrates an algorithm for a process depicted in FIG's 5B and 5C, according to an embodiment of the present invention.

Figure 8:
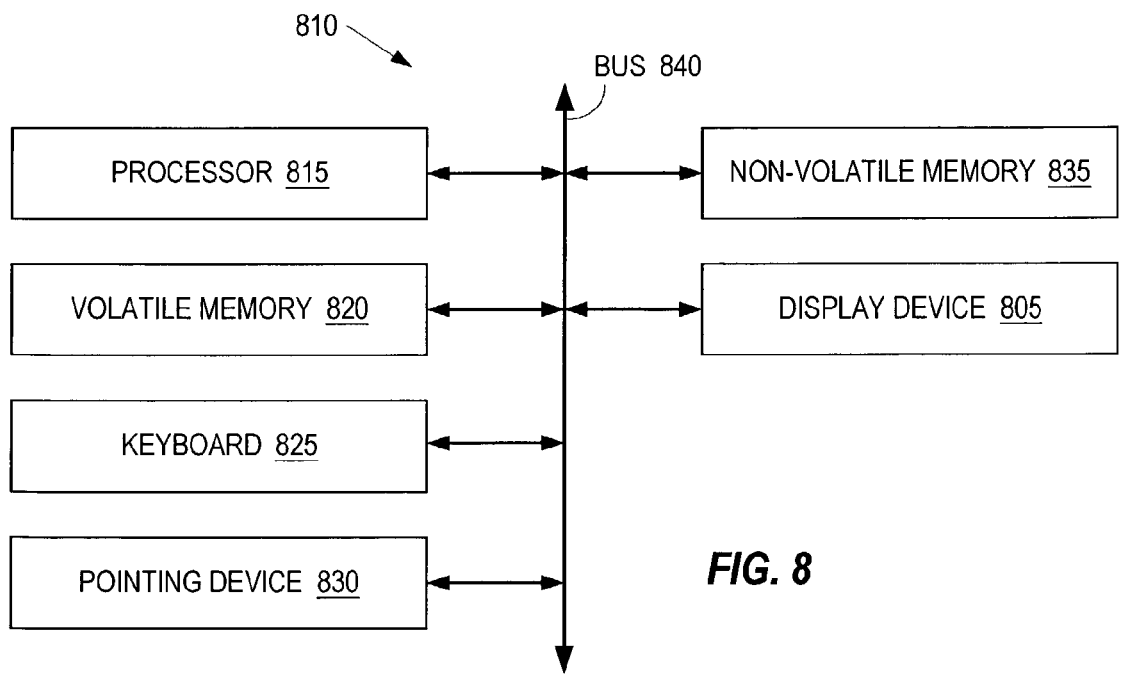

FIG. 8 illustrates a computer system that is generally applicable for the various embodiments described herein, according to the present invention.

DETAILED DESCRIPTION OF A PREFERRED EMBODIMENT

The claims at the end of this application set out novel features which applicant believes are characteristic of the invention. The invention, a preferred mode of use, objectives and advantages, will best be understood by reference to the following detailed description of an illustrative embodiment read in conjunction with the accompanying drawings.

Figure 1:
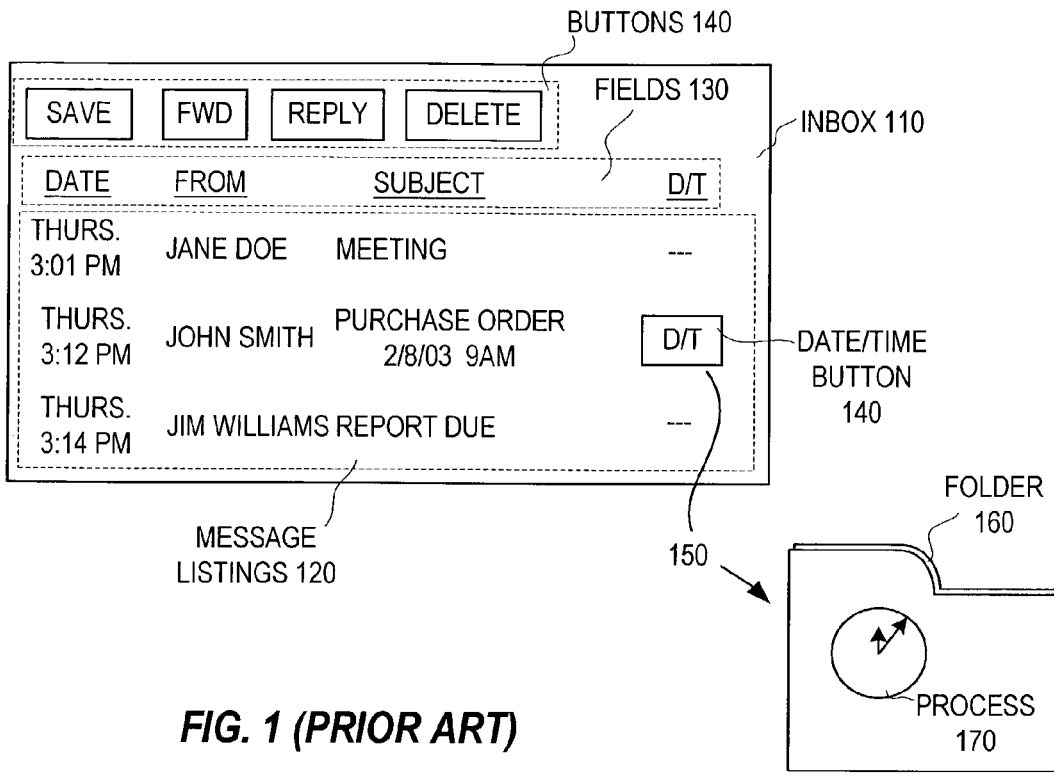
FIG. 1 illustrates a view of an e-mail inbox, according to the prior art.
Figure 2:
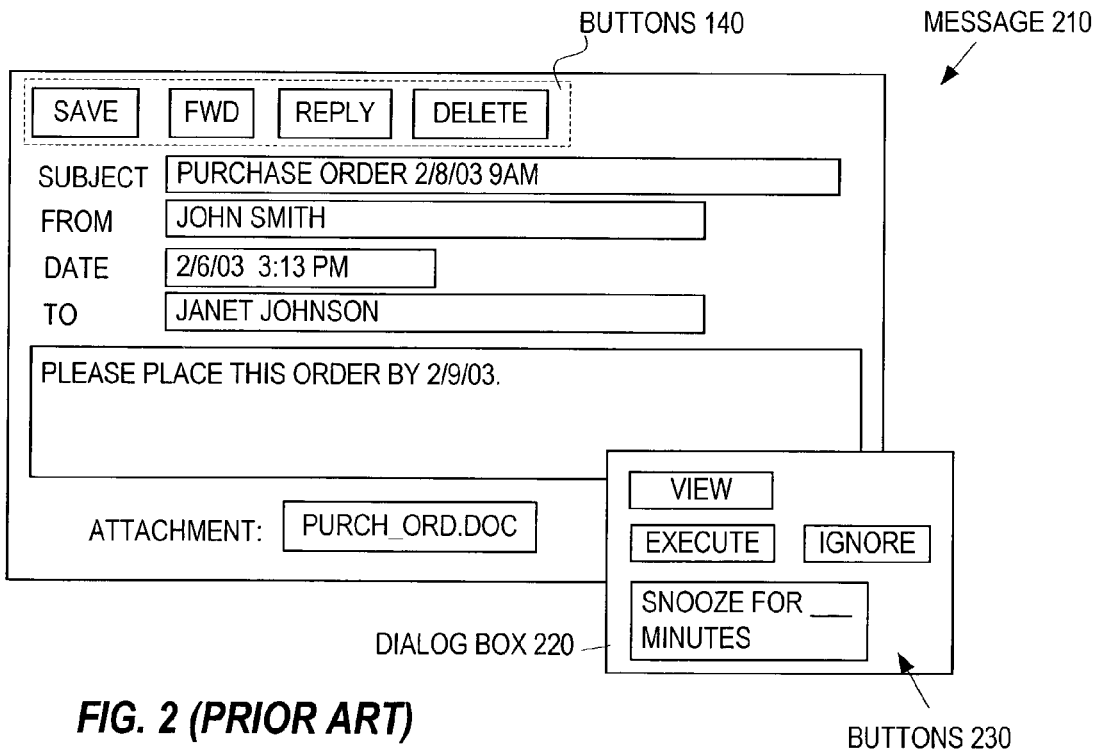
FIG. 2 illustrates an e-mail and dialog box for managing the e-mail, according to the prior art.
Figure 3:
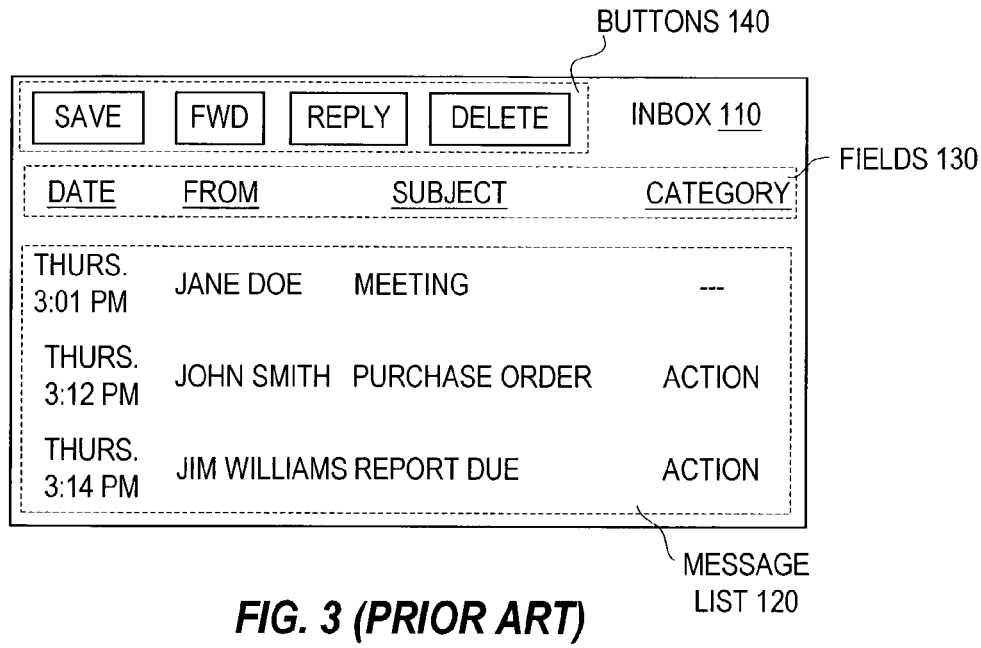
FIG. 3 illustrates another view of an e-mail inbox, according to the prior art.
Figure 4:
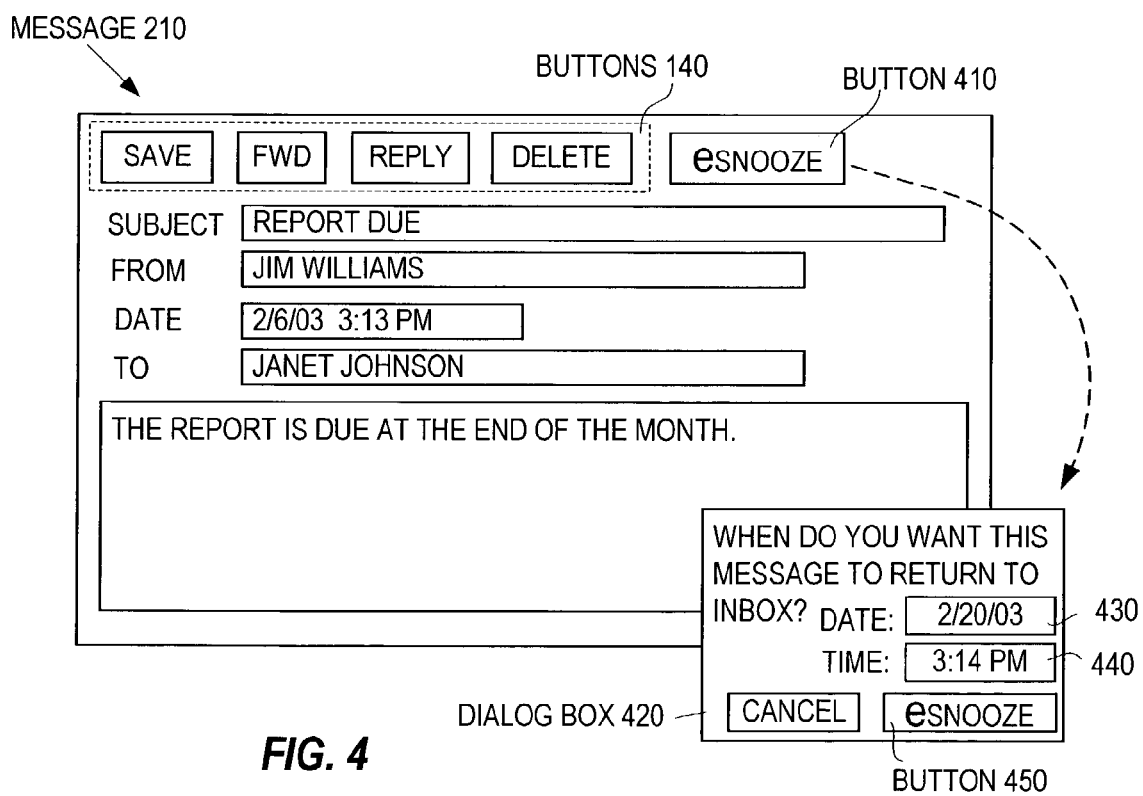
FIG. 4 illustrates another view of an e-mail message and a dialog box for managing the e-mail, according to an embodiment of the present invention.

Referring now to FIG. 4, an e-mail message 210 is depicted, according to an embodiment of the present invention. A button 410 is included in the user interface for viewing an "esnooze" dialog box 420 for the message 210. When the user actuates the button 410 the dialog box 420 pops up, presenting the user with means for removing the message 210 from the user's inbox (not shown in FIG. 4) and rescheduling the return of the message 210 to the user's inbox. The scheduling means includes date and time-of-day fields 430 and 440. A field for displaying or entering a date or a time-of-day, such as the date and time fields 430 and 440, is referred to herein simply as a "time" field.

Responsive to the actuation of button 410, a process automatically enters a default date and time in fields 430 and 440, respectively, such as a date and time 24 hours after the button 410 is actuated or after the date the e-mail message was sent to the user. The default offset date and time may be set by the user in a user preference dialog box (not shown). The esnooze dialog box 420 also permits the user to manually enter a different date of his or her choosing in the first field 430, or a different time in the second field 440.

In an alternative, for setting the date and time in the dialog box 420, a pop-up calendar or time-of-day window may be invoked, such as by the ure clicking another button, or by clicking on the date or the time label. Then responsive to the user selecting a date or time from the pop-up window the date or time is automatically filled into the appropriate field 430 or 440. In another alternative, a set of frequently used choices may be presented to the user to select for setting the date and time in the dialog box 420, such as 24 hours later, 48 hours later, one week later and one month later.

The dialog box 420 also includes a button 450 which the user can actuate once the user is satisfied with the entries in fields 430 and 440.

Figure 5A:
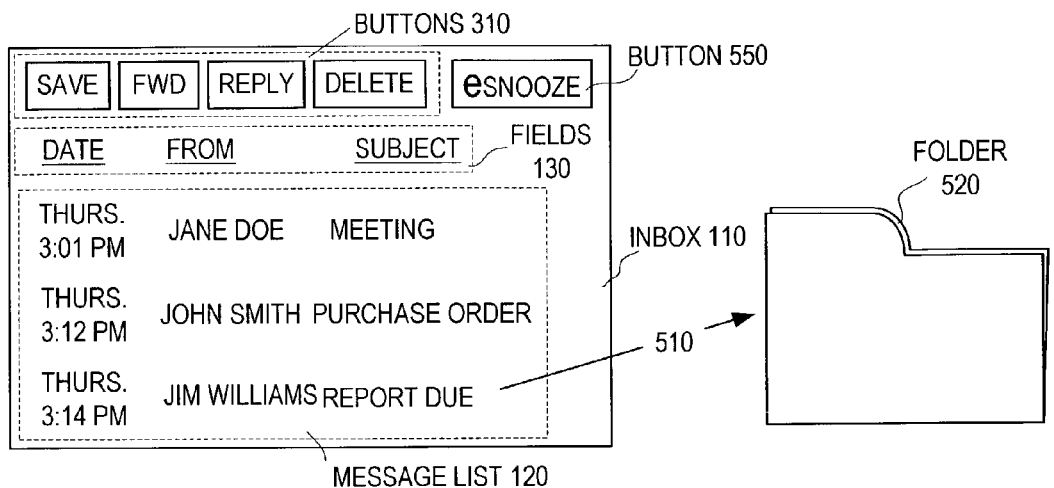
Figure 5B:
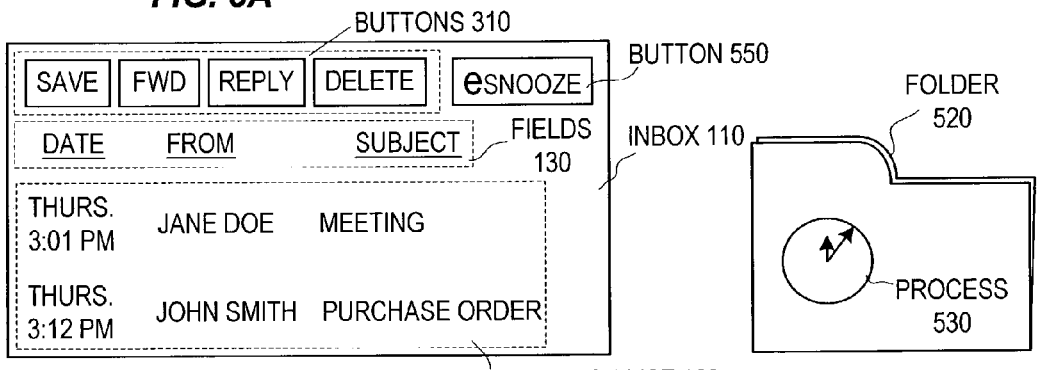

Referring now to FIG's 5A through 5C, further processing of the message 210 of FIG. 4 is depicted, according to an embodiment of the present invention. As shown in FIG. 5A, the message list 120 indicates that there are three messages in the inbox 110 at the time depicted. In the example depicted in FIG. 5A, the message list is being viewed on Feb. 6, 2003, and all three messages listed for the inbox 110 were sent that same day. The inbox 110 view includes another "esnooze" button 550. By selecting one of the messages in the list 120 and then actuating the button 550, a dialog box such as dialog box 420 shown in FIG. 4 pops up for the message. Responsive to the actuation of the button 450 of the dialog box 420, the message 210 depicted in detail in FIG. 4 is moved 510 from the inbox 110 to an "eSnooze" folder 520. As shown in FIG. 5B, which is later on the same day, Feb. 6, 2002, after the message 210 (FIG. 4) has been moved to the folder 520 the message list 120 shows that the message 210 is no longer in the inbox 110. A process 530 for the message 210 controls residence of the message 210 in the folder 520.

Figure 5C:
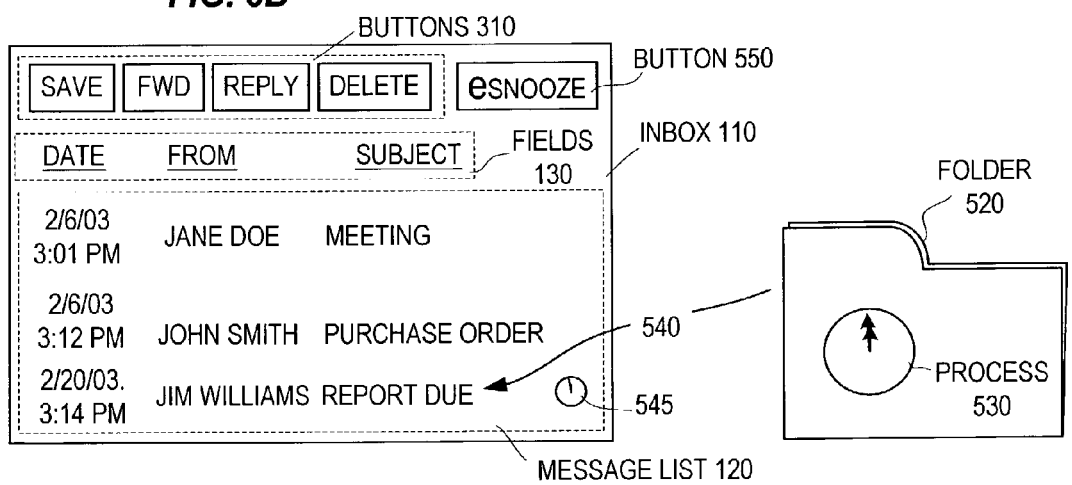

Referring now to FIG. 5C, the message list is shown on Feb. 20, 2003, on the same day the message 210 is returned to the inbox 110 and immediately after the message 210 is returned. For the purpose of the illustration the same three messages as shown in FIG's 5A and 5B on Feb. 6, 2003 are listed. As shown, at the scheduled time the process 530 returns 540 the message 210 (FIG. 4) to the inbox 110, and the message list 120 accordingly indicates that the message 210 is now back in the inbox 110. Note that the message list 120 indicates a new date for the returning e-mail message, that is, the date that the message 210 is returned. This serves to alert the user, since the message will also appear as unread. In one embodiment, an additional "original date" field 130 is included for the inbox 110. For messages that have been re-sent by esnooze, such as the message from Jim Williams in FIG. 5C, the "original date" field 130 displays the original date the message was sent, e.g., Feb. 6, 2003 for the message from Jim Williams. In an alternative embodiment, the returning message 210 retains its original date.

Referring now to FIG. 6, in an aspect relating to the dating of the returned message 210, in one embodiment text 610 is automatically inserted in the body of the e-mail message 210 indicating the original date of the message 210 and indicating that the message 210 has been re-sent by "esnooze."

Referring again to FIG. 5C, in one embodiment an indicia of the esnooze re-sending is automatically included in the message list 120 to even more clearly alert the user. In one embodiment this indicator includes a distinctive color for the text of the listing. In the embodiment illustrated in FIG. 5C, the indicator includes a special icon 545 in the list 120. In another embodiment, the indicator includes text in a certain field of the list, such as a "category" field (not shown in FIG. 5C).

Referring now to FIG. 7, an algorithm 700 is shown for process 530 depicted in FIG's 5B and 5C, according to an embodiment of the present invention. Various steps of FIG. 7 may be added, omitted, combined, altered, or performed in a different sequence. An instance of the algorithm 700 begins at 710 responsive to the user viewing an e-mail message 210 (FIG. 4), and then at 715 monitors for actuation of the "esnooze" button 410 (FIG. 4). If the button 410 is not actuated the algorithm 700 continues to monitor. If the button 410 is actuated, the algorithm proceeds to block 720 and generates dialog box 420 (FIG. 4). Block 720 includes generating a default date and time in the respective fields 430 and 440, as previously described. At block 725, the algorithm 700 receives a user entered date or time, should the user so choose.

At block 730 the algorithm 700 and monitors for actuation of a button 450 in the dialog box 420. If no button 450 is actuated the algorithm 700 continues to monitor. If a button 450 is actuated, the algorithm 700 proceeds to block 735. If the "cancel" one of the buttons 750 has been actuated, the algorithm 700 closes the dialog box 420 at logic block 740 and then proceeds to terminate, at "end" 775. If the "esnooze" one of the button 750 has been actuated, the algorithm 700 proceeds to block 745 and determines whether a folder 520 (e.g., FIG. 5A) already exists. If not, then at 750 a folder 520 is created. Subsequently, or otherwise, at block 755 the algorithm 700 moves the message 210 to the folder 520.

Next, at 760, a timer process is initiated. According to one embodiment this includes a call to a timer that counts down to the date and time that were specified as previously described. According to another embodiment this includes associating the date and time with the e-mail message 210 stored in the folder, such as by embedding the date and time temporarily at the beginning or end of the body of the e-mail message or in the date field, and then periodically launching a routine to compare the current date and time with the embedded date and time. The routine in this embodiment preferably removes the date and time from the body of the message before returning the message to the user's inbox, so as to avoid any confusion concerning the original text. According to yet another embodiment initiating the timer process includes establishing a persistence table. That is, since it would take considerable resources to periodically search through embedded dates in the text of message, there may be an efficiency improvement may by establishing a table, which provides a more efficient data structure.

Regardless of how the timing process is implemented, at block 765 the process 700 determines if the time has arrived to return the message 210 to the inbox 110. If so, the process 700 proceeds to do so at block 770. Otherwise it waits at 765. Once the message 210 has been moved from the folder 520 back to the inbox 110, the instance of the algorithm 700 for the particular message 210 terminates at 775.

Referring to FIG. 8, a computer system 810 is shown that is generally applicable for the various embodiments described according to the present invention. The system 810 includes a processor 815, a volatile memory 820, e.g., RAM, a keyboard 825, a pointing device 830, e.g., a mouse, a nonvolatile memory 835, e.g., ROM, hard disk, floppy disk, CD-ROM, and DVD, and a display device 805 having a display screen. Memory 820 and 835 are for storing program instructions, which are executable by processor 815, to implement various embodiments of a method in accordance with the present invention. Components included in system 810 are interconnected by bus 840. A communications device (not shown) may also be connected to bus 840 to enable information exchange between system 810 and other devices.

In various embodiments system 810 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C++ objects, Java and Microsoft Foundation Classes (MFC).

It should be appreciated from the above that the present invention advantageously provides a means for a user to easily remove an e-mail from the user's inbox merely by the click of a button, and easily and cleanly specify a date and time for an e-mail to be returned to the user's inbox by the use of dedicated fields in a dialog box. It should be also appreciated that users typically refer to their inboxes many times during the course of an average business day, and that in at least some respects it is advantageous that the invention provides a means for actually removing messages from the inbox, thereby reducing the number of messages that the user has to filter through as the user scans message listings. Furthermore, it is advantageous the invention provides a balance between intrusiveness and obscurity. That is, according to the invention a returning e-mail message does not intrusively pop up automatically on the user's display screen, but on the other hand due to the freshness of the date on the message it does tend to alert the user when the user looks at his or her inbox.

Also, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for managing e-mail messages comprising:
   a) generating a first snooze button associated with a user interface for displaying e-mail messages, wherein the e-mail messages have been sent to the user;
   b) generating a dialog box responsive to user activation of an instance of the first snooze button associated with a displayed one of the e-mail messages, wherein the dialog box displays a second snooze button and at least one time field for specifying a time;
   c) removing the e-mail message from the user inbox and moving the message to a snooze folder responsive to user activation of the second snooze button;
   d) initiating a timing process for the e-mail message responsive to a time specified in the at least one time field and responsive to the user activation of the second snooze button; and
   e) re-sending the e-mail message from the snooze folder back to the user inbox responsive to the timing process detecting occurrence of the time specified in the a least one time field.

2. The method of claim 1, comprising:
   displaying, in a message list of the e-mail messages in the user inbox, an indication that the message has been removed from and subsequently re-sent to the user inbox.

3. The method of claim 1, wherein the e-mail message was originally sent to the user at a first certain time and in step e) the e-mail is re-sent at a second certain time, and wherein the method comprises the step of replacing, in a portion of the e-mail, the first certain time with the second certain time.

4. The method of claim 3, wherein the method comprises the step of inserting text in a portion of the e-mail message, wherein the text indicates the first certain time and indicates that the e-mail message has been re-sent to the inbox.

5. The method of claim 1, wherein the at least one time field includes a first field for specifying a date and a second field for specifying a time of day.

6. The method of claim 1, comprising the step of specifying a default time automatically in the at least one time field.

7. The method of claim 1, wherein the e-mail message was originally sent to the user at a first certain time and in step e) the e-mail is re-sent at a second certain time, and wherein the method comprises the step of displaying both the first and second dates for the message in an display of a list of e-mail messages.

8. An apparatus comprising:
   a processor;
   a memory having instructions operable with the processor for managing e-mail messages to perform the steps of:

a) generating a first snooze button associated with a user interface for displaying e-mail messages, wherein the e-mail messages have been sent to the user;
b) generating a dialog box responsive to user activation of an instance of the first snooze button associated with a displayed one of the e-mail messages, wherein the dialog box displays a second snooze button and at least one time field for specifying a time;
c) removing the e-mail message from the user inbox and moving the message to a snooze folder responsive to user activation of the second snooze button;
d) initiating a timing process for the e-mail message responsive to a time specified in the at least one time field and responsive to the user activation of the second snooze button; and
e) re-sending the e-mail message from the snooze folder back to the user inbox responsive to the timing process detecting occurrence of the time specified in the a least one time field.

9. The apparatus of claim 8, the memory including instructions operable with the processor to perform the step of:
displaying, in a message list of the e-mail messages in the user inbox, an indication that the message has been removed from and subsequently re-sent to the user inbox.

10. The apparatus of claim 8, wherein the e-mail message was originally sent to the user at a first certain time and in step e) the e-mail is re-sent at a second certain time, the memory including instructions operable with the processor to perform the step of:
replacing, in a portion of the e-mail, the first certain time with the second certain time.

11. The apparatus of claim 10, the memory including instructions operable with the processor to perform the step of:
inserting text in a portion of the e-mail message, wherein the text indicates the first certain time and indicates that the e-mail message has been re-sent to the inbox.

12. The apparatus of claim 8, wherein the at least one time field includes a first field for specifying a date and a second field for specifying a time of day.

13. The apparatus of claim 8, the memory including instructions operable with the processor to perform the step of:
specifying a default time automatically in the at least one time field.

14. The apparatus of claim 8, wherein the e-mail message was originally sent to the user at a first certain time and in step e) the e-mail is re-sent at a second certain time, the memory including instructions operable with the processor to perform the step of:
displaying both the first and second dates for the message in an display of a list of e-mail messages.

15. A computer program product for use in managing e-mail messages, the computer program product comprising computer readable storage media comprising:

first instructions for generating a first snooze button associated with a user interface for displaying e-mail messages, wherein the e-mail messages have been sent to the user;
second instructions for generating a dialog box responsive to user activation of an instance of the first snooze button associated with a displayed one of the e-mail messages, wherein the dialog box displays a second snooze button and at least one time field for specifying a time;
third instructions for removing the e-mail message from the user inbox and moving the message to a snooze folder responsive to user activation of the second snooze button;
fourth instructions for initiating a timing process for the e-mail message responsive to a time specified in the at least one time field and responsive to the user activation of the second snooze button; and
fifth instructions for re-sending the e-mail message from the snooze folder back to the user inbox responsive to the timing process detecting occurrence of the time specified in the at least one time field.

16. The computer program product of claim 15, the computer readable storage media comprising:
instructions for displaying, in a message list of the e-mail messages in the user inbox, an indication that the message has been removed from and subsequently re-sent to the user inbox.

17. The computer program product of claim 15, wherein the e-mail message was originally sent to the user at a first certain time and wherein responsive to the fifth instructions the e-mail is re-sent at a second certain time, and wherein the instructions include instructions for replacing, in a portion of the e-mail, the first certain time with the second certain time.

18. The computer program product of claim 17, the computer readable storage media comprising:
instructions for inserting text in a portion of the e-mail message, wherein the text indicates the first certain time and indicates that the e-mail message has been re-sent to the inbox.

19. The computer program product of claim 15, wherein the at least one time field includes a first field for specifying a date and a second field for specifying a time of day.

20. The computer program product of claim 15, the computer readable storage media comprising:
instructions for specifying a default time automatically in the at least one time field.

21. The computer program product of claim 15, wherein the e-mail message was originally sent to the user at a first certain time and wherein responsive to the fifth instructions the e-mail is re-sent at a second certain time, the computer readable storage media comprising:
instructions for displaying both the first and second dates for the message in an display of a list of e-mail messages.

* * * * *